US009884587B2

(12) United States Patent
Konishi et al.

(10) Patent No.: US 9,884,587 B2
(45) Date of Patent: Feb. 6, 2018

(54) DISPLAY DEVICE FOR VEHICLE

(71) Applicant: HONDA MOTOR CO., LTD., Tokyo (JP)

(72) Inventors: Yasuhiro Konishi, Wako (JP); Tetsuya Kawahara, Wako (JP); Megumi Nagumo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 299 days.

(21) Appl. No.: 14/744,292

(22) Filed: Jun. 19, 2015

(65) Prior Publication Data

US 2015/0379773 A1 Dec. 31, 2015

(30) Foreign Application Priority Data

Jun. 27, 2014 (JP) ................................ 2014-132567

(51) Int. Cl.
  *G09G 3/34* (2006.01)
  *B60Q 3/04* (2006.01)
  *B60K 37/02* (2006.01)

(52) U.S. Cl.
  CPC ............. *B60Q 3/044* (2013.01); *B60K 37/02* (2013.01); *G09G 3/342* (2013.01); *B60K 2350/2017* (2013.01); *B60K 2350/2056* (2013.01); *B60K 2350/2065* (2013.01)

(58) Field of Classification Search
  CPC B60Q 3/044; B60K 37/02; B60K 2350/2065; B60K 2350/2056; B60K 2350/2017; B60K 2350/2052; G02B 27/01; G02B 2027/0196; G09G 3/003; G09G 2380/10; G09G 3/342; B60R 2300/205
  See application file for complete search history.

(56) References Cited

U.S. PATENT DOCUMENTS

| 5,361,165 A * | 11/1994 | Stringfellow | G02B 5/10 |
| | | | 340/461 |
| 6,120,159 A * | 9/2000 | Inoguchi | B60K 37/02 |
| | | | 362/23.01 |
| 6,382,127 B2 * | 5/2002 | Wehner | B60K 37/02 |
| | | | 116/284 |

(Continued)

FOREIGN PATENT DOCUMENTS

| JP | 7-15424 U | 3/1995 |
| JP | 2000-168397 A | 6/2000 |

(Continued)

OTHER PUBLICATIONS

Office Action dated Dec. 13, 2016, issued in counterpart Japanese Patent Application No. 2014-132567, with English translation. (6 pages).

*Primary Examiner* — Premal Patel
(74) *Attorney, Agent, or Firm* — Westerman, Hattori, Daniels & Adrian (57) ABSTRACT

A display device for a vehicle includes a decorative member; a light source that emits light to the decorative member; and a virtual image generation unit that displays a virtual image between a driver of the vehicle and the decorative member. The light source is disposed closer to the driver than the decorative member, and is alternately switchable between a light-on state and a light-off state when the virtual image generation unit displays a virtual image.

12 Claims, 5 Drawing Sheets

(56) References Cited

U.S. PATENT DOCUMENTS

| | | | | |
|---|---|---|---|---|
| 6,411,216 B1* | 6/2002 | Fukushima | ............ | B60K 37/02 |
| | | | | 340/459 |
| 2006/0158320 A1* | 7/2006 | Shibata | .................. | B60K 37/02 |
| | | | | 340/425.5 |
| 2008/0123322 A1* | 5/2008 | Tane | ...................... | B60K 35/00 |
| | | | | 362/23.01 |
| 2012/0287664 A1* | 11/2012 | Coser | ..................... | B60K 35/00 |
| | | | | 362/559 |
| 2016/0221440 A1* | 8/2016 | Tane | ...................... | B60K 35/00 |

FOREIGN PATENT DOCUMENTS

| | | |
|---|---|---|
| JP | 2002-081966 A | 3/2002 |
| JP | 2005-291718 A | 10/2005 |
| JP | 2011-013106 | 1/2011 |
| JP | 2012-056384 | 3/2012 |
| JP | 5082911 B2 | 11/2012 |

* cited by examiner

DISPLAY DEVICE FOR VEHICLE

CROSS REFERENCES TO RELATED APPLICATIONS

The present application claims priority under 35 U.S.C. $ 119 to Japanese Patent Application No. 2014-132567, filed Jun. 27, 2014, entitled "Display Device for Vehicle." The contents of this application are incorporated herein by reference in their entirety.

TECHNICAL FIELD

The present disclosure relates to a display device for a vehicle.

BACKGROUND

In order to display various information, image display devices such as liquid crystal displays have been conventionally used in display devices for vehicle that display information such as a vehicle speed and an engine rotational speed. However, such an image display device displays a planar image which provides less 3D effect and inferior design compared with an image displayed by a mechanical display device. On the other hand, display devices for vehicle have been disclosed, the display devices being capable of providing display with 3D effect by displaying a real image and a virtual image using a mechanical member such as meter and an image display device at the same time.

For example, Japanese Patent No. 5082911 discloses a display device (which corresponds to "the display device for a vehicle" in the claims) that includes a display unit that provides switchable display between a first image and a second image; a light source; a light emitting display member (which corresponds to the "decorative member" in the claims) that has a thickness and receives light emitted from the light source and displays with emission; a plate-shaped member that is disposed between the display unit and the light emitting display member and has a light reflectivity and a light transparency, the plate-shaped member allowing light of one of an image of the display unit and the light emitting display member to pass therethrough to a user's eyes and causing light of the other of the image of the display unit and the light emitting display member to be reflected to a user's eyes; and a control unit that controls the turn-on and turn-off of the light source and displays the first image on the display unit when the light source is turned on and displays the second image on the display unit when the light source is turned off. In the display device, one of the images is displayed as a real image and the other one is displayed as a virtual image. When the light source is turned on, the real image and the virtual image are made close to each other and displayed. The first image includes plural information images, and at least part of the light emitting display member which is turned on is displayed as a boundary image that indicates a boundary between the information images. Japanese Patent No. 5082911 claims that the display device described therein is capable of providing 3D effect to an image of the display unit and of ensuring the flexibility of display by the display unit.

Japanese Unexamined Patent Application Publication (JP-A) No. 7-15424 discloses a display device (which corresponds to "the display device for a vehicle" in the claims) in which a half mirror is provided that intersects with the visual recognition direction of a user, a first display unit is provided in rear of the half mirror, a second display unit is provided in front of the half mirror, display of the first display unit is visually recognizable through the half mirror as a real image, and display of the second display unit is visually recognizable through the half mirror as a virtual image, where the rear surface of the half mirror is provided with a polarizing member that causes transmitted light from the first display unit to be P-wave polarized.

JP-A No. 7-15424 claims that double display is suppressed and clear display is achieved by the display device described therein in which S-wave polarized light in transmitted light from the first display unit is not allowed to enter the half mirror, the S-wave polarized light being likely to be reflected by the half mirror.

However, in the display device described in Japanese Patent No. 5082911, the light emitting display member itself emits light due to the light source, and thus 3D effect on the light emitting display member itself is not visually recognized easily. Therefore, there is room for improvement in design of the display device described in Japanese Patent No. 5082911.

In the display device described in JP-A No. 7-15424, because the first display unit is visually recognizable as a real image all the time, the area where an image from the second display unit is displayed as a virtual image is limited, and thus flexibility in displayable information is low. Therefore, there is room for improvement in ensuring the flexibility of display of the display device described in JP-A No. 7-15424.

SUMMARY

Thus, the present disclosure provides a display device for a vehicle, the display device having high flexibility and excellent design. In the following explanation of the exemplary embodiment, specific elements with their reference numerals are indicated by using brackets. These specific elements are presented as mere examples in order to facilitate understanding, and thus, should not be interpreted as any limitation to the accompanying claims.

An aspect of the present disclosure provides a display device for a vehicle, the display device including: a decorative member (for example, the decorative member 30 in the embodiments); a light source (for example, the light source 40 in the embodiments) that emits light to the decorative member; and a virtual image generation unit (for example, the virtual image generation unit 20 in the embodiments) that displays a virtual image between a driver of the vehicle and the decorative member. The light source is disposed closer to the driver than the decorative member, and is alternately switchable between a light-on state and a light-off state when the virtual image generation unit displays a virtual image.

According to this aspect, the light source emits light from the driver side to the decorative member, and thus the decorative member casts a shadow and the driver visually recognizes a 3D effect of the decorative member. Consequently, the display device for a vehicle displays a virtual image between the decorative member and the driver according to the shape of the decorative member, and superimposition of the decorative member and the virtual image achieves display of an image close to a real image. Also, even when the light source is turned off and the decorative member is not visually recognizable, the virtual image generation unit is capable of displaying a virtual image. Therefore, the virtual image generation unit is capable of displaying a virtual image also in the area where the decorative member is disposed as viewed from the driver, the virtual image being not restricted by the shape of the decorative member. Consequently, it is possible to provide a display device for a vehicle, the display device having high flexibility and excellent design.

The display device for a vehicle preferably includes plural decorative members, and plural light sources that emit light to the decorative members separately.

According to this aspect, the plural decorative members are provided to which light is emitted separately by the light sources, and thus the types of information displayed as a virtual image and display positions may be diversified. Consequently, the display device for a vehicle achieves display having high flexibility and excellent design.

In the display device for a vehicle, preferably, the decorative members include a first decorative member (for example, the right decorative member 32 in the embodiments) and a second decorative member (for example, the left decorative member 31 in the embodiments), the light sources include a first light source (for example, the right light source 42 in the embodiments) capable of emitting light to the first decorative member, and a second light source (for example, the left light source 41 in the embodiments) capable of emitting light to the second decorative member, and the virtual image generation unit displays a virtual image between the driver and the first decorative member when the first light source is in light-off state and the second light source is in light-on state, and displays a virtual image between the driver and the second decorative member when the first light source is in light-on state and the second light source is in light-off state.

According to this aspect, when light is emitted to one of the first decorative member and the second decorative member by the light source and the one is visually recognizable to the driver, the other decorative member is not visually recognizable to the driver. Therefore, the display device for a vehicle is capable of displaying a superimposed image of the decorative member and the virtual image in the area where the one decorative member is disposed as viewed from the driver, and of displaying a virtual image in the area where the other decorative member is disposed as viewed from the driver, the virtual image being not restricted by the shape of the other decorative member. Consequently, the display device for a vehicle achieves display having high flexibility and excellent design.

In the display device for a vehicle, preferably, the virtual image generation unit displays a virtual image of a needle gauge indicating a vehicle speed between the first decorative member and the driver when light is emitted to the first decorative member by the first light source, and displays a virtual image of a needle gauge indicating an engine rotational speed between the second decorative member and the driver when light is emitted to the second decorative member by the second light source.

According to this aspect, the display device for a vehicle is capable of displaying a virtual image of a needle gauge indicating a vehicle speed on the first decorative member as viewed from the driver, and of hiding a virtual image of a needle gauge indicating an engine rotational speed. Thus, vehicle speed information necessary at the time of vehicle running is displayed all the time, while information on engine rotational speed is being hidden and other information being displayed. Consequently, the display device for a vehicle achieves display having high flexibility.

In the display device for a vehicle, preferably, a divider plate (for example, the divider plate 19 in the embodiments) is provided upright between the decorative members adjacent to each other to avoid leakage of light which is emitted from the light sources.

According to this aspect, a divider plate is provided upright between the decorative members adjacent to each other to avoid leakage of light which is emitted from the light sources, and thus the light emitted from the light source in light-on state is not allowed to leak into a decorative member other than the target decorative member to be emitted. Thus, it is possible to avoid a situation in which a decorative member other than the target decorative member is visually recognizable to the driver due to leakage light. Consequently, the display device for a vehicle achieves high display quality.

In the display device for a vehicle, preferably, the decorative member is composed of a metal material.

According to this aspect, because of emission of light to the decorative member from the light source, the decorative member provides a 3D effect and visual texture of metal material. Consequently, the display device for a vehicle achieves display having excellent design.

DESCRIPTION OF THE PREFERRED EMBODIMENTS

First Embodiment

Hereinafter, an embodiment of the present disclosure will be described with reference to the drawings.

First, a display device for a vehicle according to a first embodiment will be described.

Figure 1:
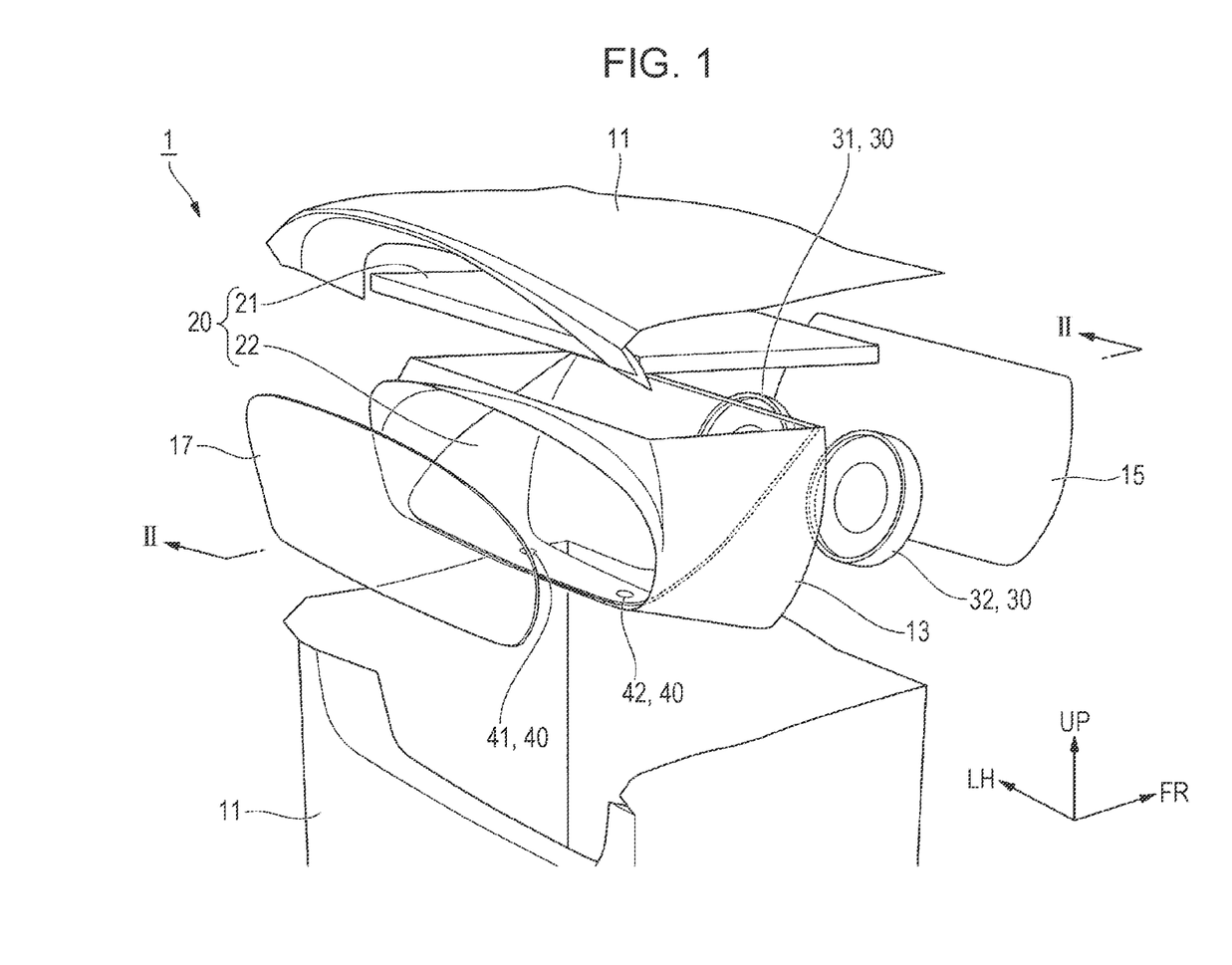
FIG. 1 is an exploded perspective view of a display device for a vehicle according to a first embodiment.
Figure 2:
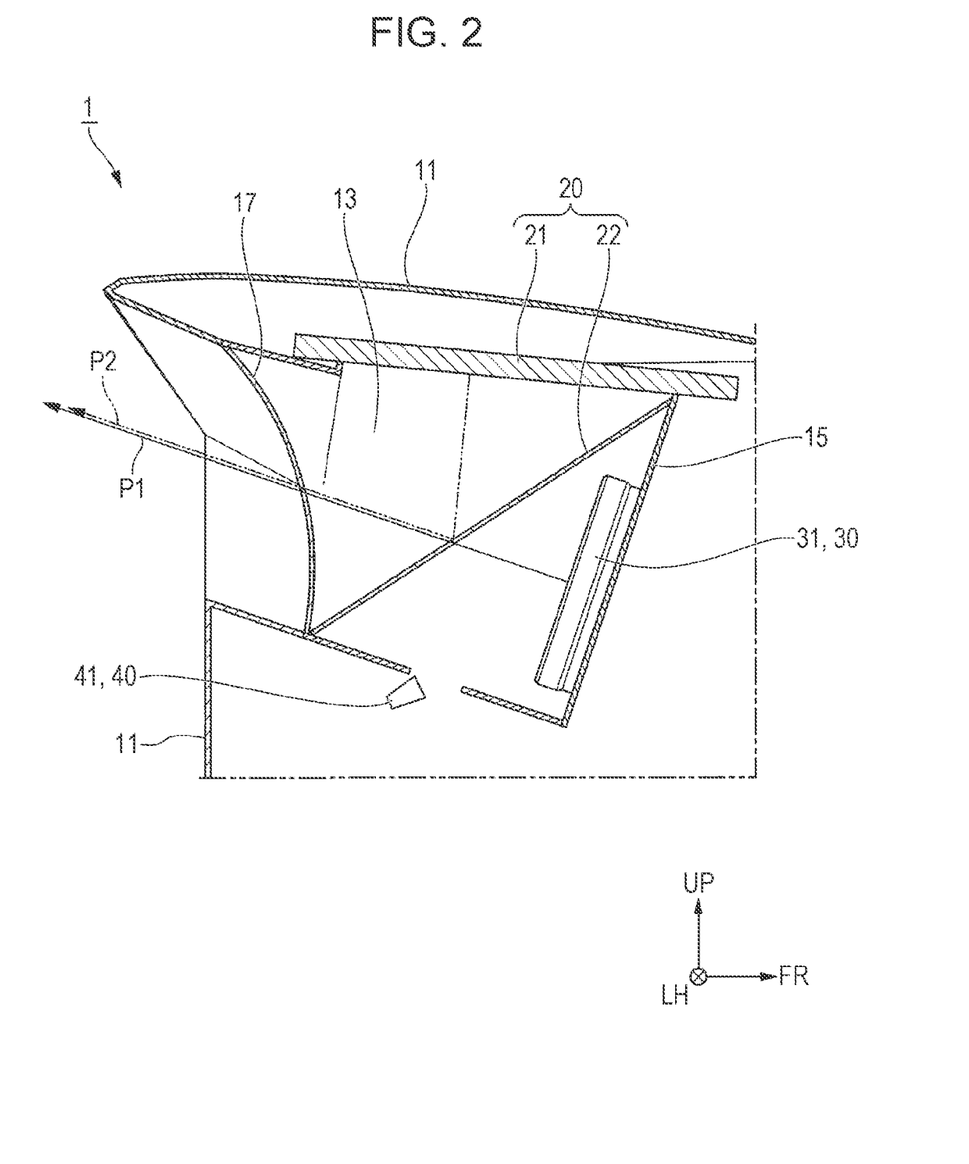
FIG. 2 is an explanatory diagram of the display device for a vehicle according to the first embodiment and is a sectional view taken along line II-II of FIG. 1.

FIG. 1 is an exploded perspective view of a display device for a vehicle according to the first embodiment. FIG. 2 is an explanatory diagram of the display device for a vehicle according to the first embodiment and is a sectional view taken along line II-II of FIG. 1.

As illustrated in FIG. 1, a display device 1 for a vehicle in this embodiment is installed in a dashboard 11 in front of the driver's seat of the vehicle and displays information such as a vehicle speed, an engine rotational speed, and a fuel meter. The display device 1 for a vehicle includes a garnish 13, a decorative member 30, a light source 40 that emits light to the decorative member 30, and a virtual image generation unit 20 that displays a virtual image between the driver of the vehicle and the decorative member 30. It is to be noted that unless otherwise stated, the frontward, rearward, upward, downward, rightward, and leftward directions in the following description are the same as the frontward, rearward, upward, downward, rightward, and leftward directions in a vehicle, and arrows UP, FR, and LH in the drawings indicate the upward direction, the frontward direction, and the leftward direction, respectively.

The garnish 13 forms the outer frame of the display device 1 for a vehicle. The garnish 13 is an elliptically-shaped cylindrical member having the major axis in the right and left direction in front view, and has openings in the front and the back. In an upper portion of the garnish 13, an opening is formed so as to communicate with the opening in the front. The inner surface of the garnish 13 is treated to have a lower reflectivity than the surface of the decorative member 30, and for example, is colored black. In the garnish 13, a lens 17 is disposed so as to close the back opening and a meter board 15 is disposed so as to close the front opening.

The lens 17 is formed of a material such as a resin material or a glass material having a light transparency. The lens 17 has an elliptic shape having the major axis in the right and left direction in front view, and has a curved surface having a vertically central portion that projects forward. The lens 17 is fitted in the back opening of the garnish 13 with the upper end of the lens 17 inclined rearward with respect to the up and down direction (see FIG. 2). Thus, the lens 17 seals the garnish 13 and prevents intrusion of dust into the garnish 13 as well as reflects outside light downward to reduce incident light into the garnish 13.

The meter board 15 is treated to have a lower reflectivity than the surface of the decorative member 30, and for example, a black non-woven fabric is coated on a decorative plate, or a decorative plate is colored black. The meter board 15 is formed to be a rectangular-shaped plate and fitted in the front opening of the garnish 13. The decorative member 30 is disposed on the major back surface of the meter board 15.

The decorative member 30 includes a left decorative member 31 (that illustratively corresponds to "the second decorative member" in the appended claims), and a right decorative member 32 (that illustratively corresponds to "the first decorative member" in the appended claims). The left decorative member 31 and the right decorative member 32 are each formed in the same shape and made of metal material, for example. The left decorative member 31 and the right decorative member 32 each include a disk-like central portion and a ring-shaped outer circumferential portion provided on the outer circumference of the central portion. The left decorative member 31 and the right decorative member 32 of the decorative member 30 are provided side-by-side from left to right in this order on the major back surface of the meter board 15.

The light source 40 includes a left light source 41 (that illustratively corresponds to "the second light source" in the appended claims) capable of emitting light to the left decorative member 31 and a right light source 42 (that illustratively corresponds to the "first light source" in the appended claims) capable of emitting light to the right decorative member 32. The light source 40 is located in rear of the decorative member 30, and the left light source 41 and the right light source 42 are provided side-by-side from left to right in this order on the internal lower surface of the garnish 13. The light source 40 is formed of, for example, a light emitting diode, and is capable of emitting light to the decorative member 30, the light having high directivity. The light source 40 is connected to a control unit (not illustrated) and may be alternately switched between light-on state and light-off state when the below-described virtual image generation unit 20 displays a virtual image.

As illustrated in FIG. 2, when light is emitted to the decoration member 30 by the light source 40 in light-on state, the light reflected by the decoration member 30 passes along an optical path P1 through a half mirror 22 and the lens 17 and is visually recognized as a real image by the driver. In this process, the light source 40 emits light to the decorative member 30 from the driver side, and thus a shadow is cast by the decorative member 30 as viewed from the driver.

As illustrated in FIG. 1, the virtual image generation unit 20 displays a virtual image between the driver of the vehicle and the decorative member 30. The virtual image generation unit 20 has an image display device 21 and a half mirror 22.

For example, a liquid crystal display may be used as the image display device 21. The image display device 21 is formed to be a rectangular-shaped plate. The image display device 21 is disposed so that its image display surface faces the inside (lower side) of the garnish 13 and the image display device 21 closes the upper opening of the garnish 13.

The half mirror 22 has a light transparency and a light reflectivity, and is obtained, for example, by forming a dielectric layer on the surface of a glass plate. The half mirror 22 is formed to be a rectangular-shaped plate and is disposed in the garnish 13 so that the upper end of the half mirror 22 is inclined forward with respect to the up and down direction, and the lower end of the half mirror 22 is located rearward of the light source 40 (see FIG. 2). The angle of inclination of the half mirror 22 with respect to the up and down direction is set to an angle that allows the driver to visually recognize an image that is displayed on the image display device 21 and reflected by the half mirror 22. That is, as illustrated in FIG. 2, an image displayed by the image display device 21 is reflected by the half mirror 22 and passes along an optical path P2 through the lens 17, and is visually recognized as a virtual image by the driver.

Next, the operation of the display device 1 for a vehicle in this embodiment will be described.

Figure 3:
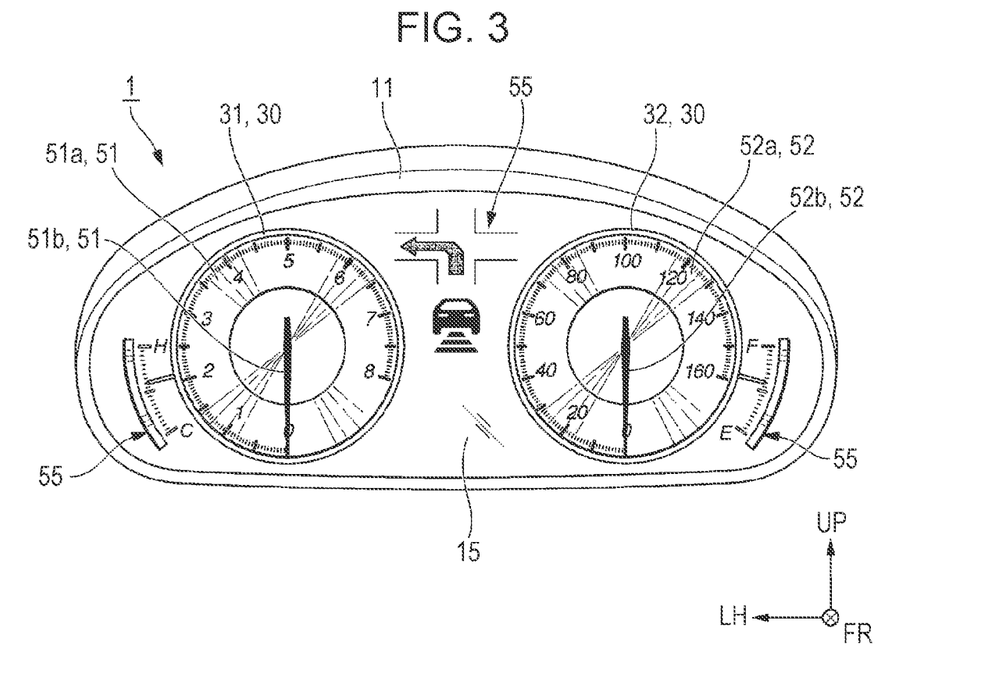
FIG. 3 is a front view illustrating a display manner in the display device for a vehicle according to the first embodiment.
Figure 4:
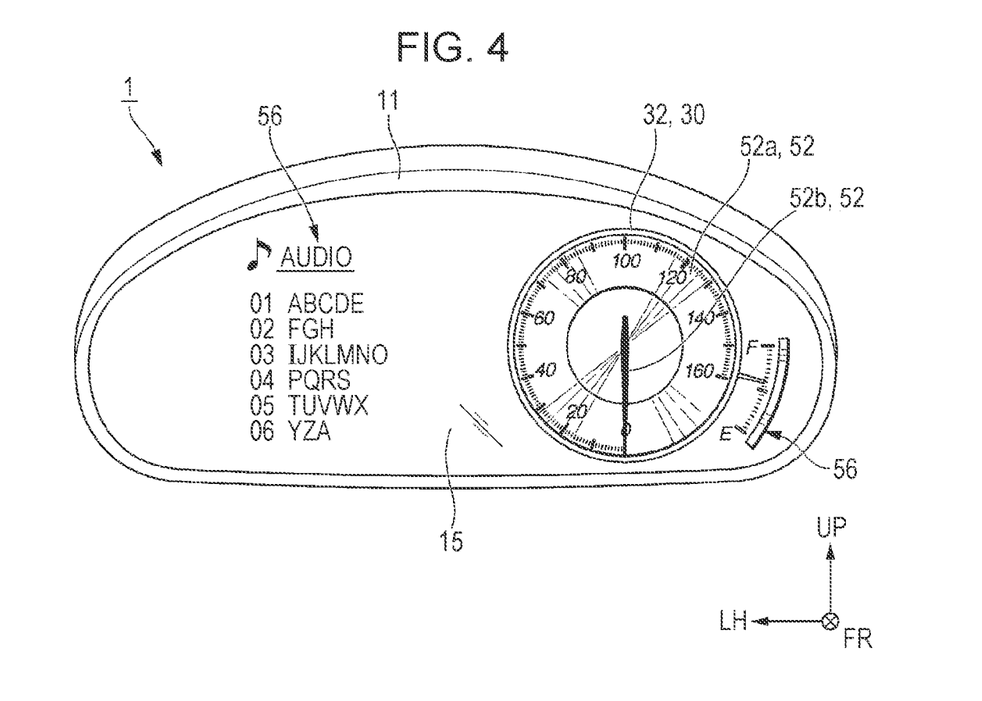
FIG. 4 is a front view illustrating a display manner in the display device for a vehicle according to the first embodiment.

FIGS. 3 and 4 are each a front view illustrating a display manner of the display device for a vehicle according to the first embodiment.

FIG. 3 illustrates the manner in which light is emitted to the left decorative member 31 and the right decorative member 32 by the light source 40. That is, the left light source 41 and the right light source 42 are in light-on state, and the left decorative member 31 and the right decorative member 32 are visually recognizable to the driver. At this point, the virtual image generation unit 20 displays a first meter image 51, a second meter image 52, and a first information image 55.

The first meter image 51 displayed by the image display device 21 is displayed on the half mirror 22 between the driver and the left decorative member 31. At this point, the first meter image 51 is visually recognized as a virtual image such that the image is displayed on the left decoration member 31 as viewed from the driver. The first meter image 51 is displayed as a virtual image of a needle gauge (hereinafter referred to as a tachometer) that displays an engine rotational speed, and the first meter image 51 includes a scale image 51a and a needle image 51b. Since the left decorative member 31 includes the disk-like central portion and the ring-shaped outer circumferential portion provided on the outer circumference of the central portion, the driver is able to visually recognize the superimposed display of the left decorative member 31 and the first meter image 51 as a tachometer.

The second meter image 52 displayed by the image display device 21 is displayed on the half mirror 22 between the driver and the right decorative member 32. At this point, the second meter image 52 is visually recognized as a virtual image such that the image is displayed on the right decoration member 32 as viewed from the driver. The second meter image 52 is displayed as a virtual image of a needle gauge (hereinafter referred to as a speedometer) that displays a vehicle speed, and the second meter image 52 includes a scale image 52a and a needle image 52b. Since the right decorative member 32 has the same configuration as the left decorative member 31, the driver is able to visually recognize the superimposed display of the right decorative member 32 and the second meter image 52 as a speedometer.

The first information image 55 displayed by the image display device 21 is displayed on the half mirror 22 between the driver and the meter board 15. At this point, the first information image 55 is visually recognized as a virtual image such that the image is displayed on the meter board 15 as viewed from the driver. In the meter board 15, the first information image 55 displays a coolant temperature meter in the left end area, a fuel meter in the right end area, and vehicle position information in the center area.

FIG. 4 illustrates the manner in which light is emitted to the right decoration member 32 by the right light source 42. In the display device 1 for a vehicle, the inner surface of the garnish 13 and the meter board 15 are treated to have a lower reflectivity than the surface of the decorative member 30, and the lens 17 is further disposed so as to reduce incidence of outside light. For this reason, when the light source 40 emits light to only one of the left decorative member 31 and the right decorative member 32, the one is visually recognizable to the driver while the other one is not visually recognizable to the driver. Therefore, in the manner illustrated in FIG. 4, the left light source 41 is in light-off state and the right light source 42 is in light-on state, and thus the left decorative member 31 is not visually recognizable to the driver and the right decorative member 32 is visually recognizable to the driver. At this point, the virtual image generation unit 20 displays the second meter image 52 and a second information image 56.

Similarly to the manner illustrated in FIG. 3, the second meter image 52 is displayed as a virtual image of the speedometer on the right decorative member 32 as viewed from the driver, and the second meter image 52 includes the scale image 52a and the needle image 52b. The driver is able to visually recognize the superimposed display of the right decorative member 32 and the second meter image 52 as the speedometer.

Similarly to the first information image 55, the second information image 56 is displayed on the meter board 15 as viewed from the driver. The second information image 56 displays a selection screen for music files in the area from the center to the left end of the meter board 15, and displays a fuel meter in the right end area of the meter board 15. That is, the second information image 56 is displayed in the area where the left decorative member 31 is visually recognized in the manner illustrated in FIG. 3 without being restricted by the shape of the left decorative member 31.

In the manner illustrated in FIG. 4, when the left light source 41 is in light-off state and the right light source 42 is in light-on state, the display device 1 for a vehicle displays the second information image 56 between the driver and the left decorative member 31. However, the manner is not limited to this. That is, when the left light source 41 is in light-on state and the right light source 42 is in light-off state, it is possible that the display device 1 for a vehicle displays the second information image 56 between the driver and the right decorative member 32.

Also, in the manner illustrated in FIG. 3, the first meter image 51 is displayed as a virtual image of the tachometer on the left decorative member 31 as viewed from the driver, and the second meter image 52 is displayed as a virtual image of the speedometer on the right decorative member 32. However, the embodiment is not limited to this. That is, the first meter image 51 may be displayed as a virtual image of the speedometer on the left decorative member 31 and the second meter image 52 may be displayed as a virtual image of the tachometer on the right decorative member 32 as viewed from the driver.

In this manner, the display device 1 for a vehicle in this embodiment includes the decorative member 30, the light source 40 that emits light to the decorative member 30, and the virtual image generation unit 20 that displays a virtual image between the driver of the vehicle and the decorative member 30. The light source 40 is disposed on the driver side (in rear) of the decorative member 30, and may be alternately switched between light-on state and light-off state when the virtual image generation unit 20 displays a virtual image.

With this configuration, since the light source 40 emits light from the driver side (rear side) to the decorative member 30, the decorative member 30 casts a shadow and the driver visually recognizes a 3D effect of the decorative member 30. Consequently, the display device 1 for a vehicle displays the first meter image 51 and the second meter image 52 between the decorative member 30 and the driver according to the shape of the decorative member 30, and superimposition of the first meter image 51 and the second meter image 52 achieves display of an image close to a real image.

Also, even when the light source 40 is turned off and the decorative member 30 is not visually recognizable, the virtual image generation unit 20 is capable of displaying a virtual image. Therefore, the virtual image generation unit 20 is capable of displaying a virtual image (the second information image 56) also in the area where the decorative member 30 is disposed as viewed from the driver, the virtual image being not restricted by the shape of the decorative member 30. Consequently, it is possible to provide the display device 1 for a vehicle, the display device 1 having high flexibility and excellent design.

In this embodiment, the display device 1 for a vehicle includes plural decorative members 30 (the left decorative member 31, the right decorative member 32), and plural light sources 40 (the left light source 41, the right light source 42) that emit light to the decorative members 30 separately.

With this configuration, the plural decorative members 30 are provided to which light is emitted separately by the light sources 40, and thus the types of information displayed as a virtual image and display positions may be diversified. Consequently, the display device 1 for a vehicle achieves display having high flexibility and excellent design.

In this embodiment, plural light sources 40 include the left light source 41 capable of emitting light to the left decorative member 31, and the right light source 42 capable of emitting light to the right decorative member 32. When the left light source 41 is in light-off state and the right light source 42 is in light-on state, the virtual image generation unit 20 displays a virtual image between the driver and the left decorative member 31. Also, when the left light source 41 is in light-on state and the right light source 42 is in light-off state, the virtual image generation unit 20 displays a virtual image between the driver and the right decorative member 32.

With this configuration, when light is emitted to one decorative member 30 out of the left decorative member 31 and the right decorative member 32 by a light source 40 and the one is visually recognizable to the driver, the other decorative member 30 is not visually recognizable to the driver. Therefore, the display device 1 for a vehicle is capable of displaying a superimposed image of the decorative member 30 and the virtual image in the area where the one decorative member 30 is disposed as viewed from the driver, and of displaying a virtual image in the area where the other decorative member 30 is disposed as viewed from the driver, the virtual image being not restricted by the shape of the other decorative member 30. Consequently, the display device 1 for a vehicle achieves display having high flexibility and excellent design.

In this embodiment, when light is emitted to the right decorative member 32 by the right light source 42, the virtual image generation unit 20 displays a virtual image (the second meter image 52) of the speedometer between the right decorative member 32 and the driver. Also, when light is emitted to the left decorative member 31 by the left light source 41, the virtual image generation unit 20 displays a virtual image (the first meter image 51) of the tachometer between the left decorative member 31 and the driver.

With this configuration, the display device 1 for a vehicle is capable of displaying a virtual image (the second meter image 52) of the speedometer on the right decorative member 32 as viewed from the driver, and of hiding the display of a virtual image of the tachometer (the first meter image 51). Thus, vehicle speed information necessary at the time of vehicle running is displayed all the time, while information on engine rotational speed being hidden and other information being displayed. Consequently, the display device 1 for a vehicle achieves display having high flexibility.

In this embodiment, the decoration member 30 is composed of a metal material.

With this configuration, because of emission of light to the decorative member 30 from each light source 40, the decorative member 30 provides a 3D effect and visual texture of metal material. Consequently, the display device 1 for a vehicle achieves display having excellent design.

Second Embodiment

Next, a display device for a vehicle according to a second embodiment will be described.

Figure 5:
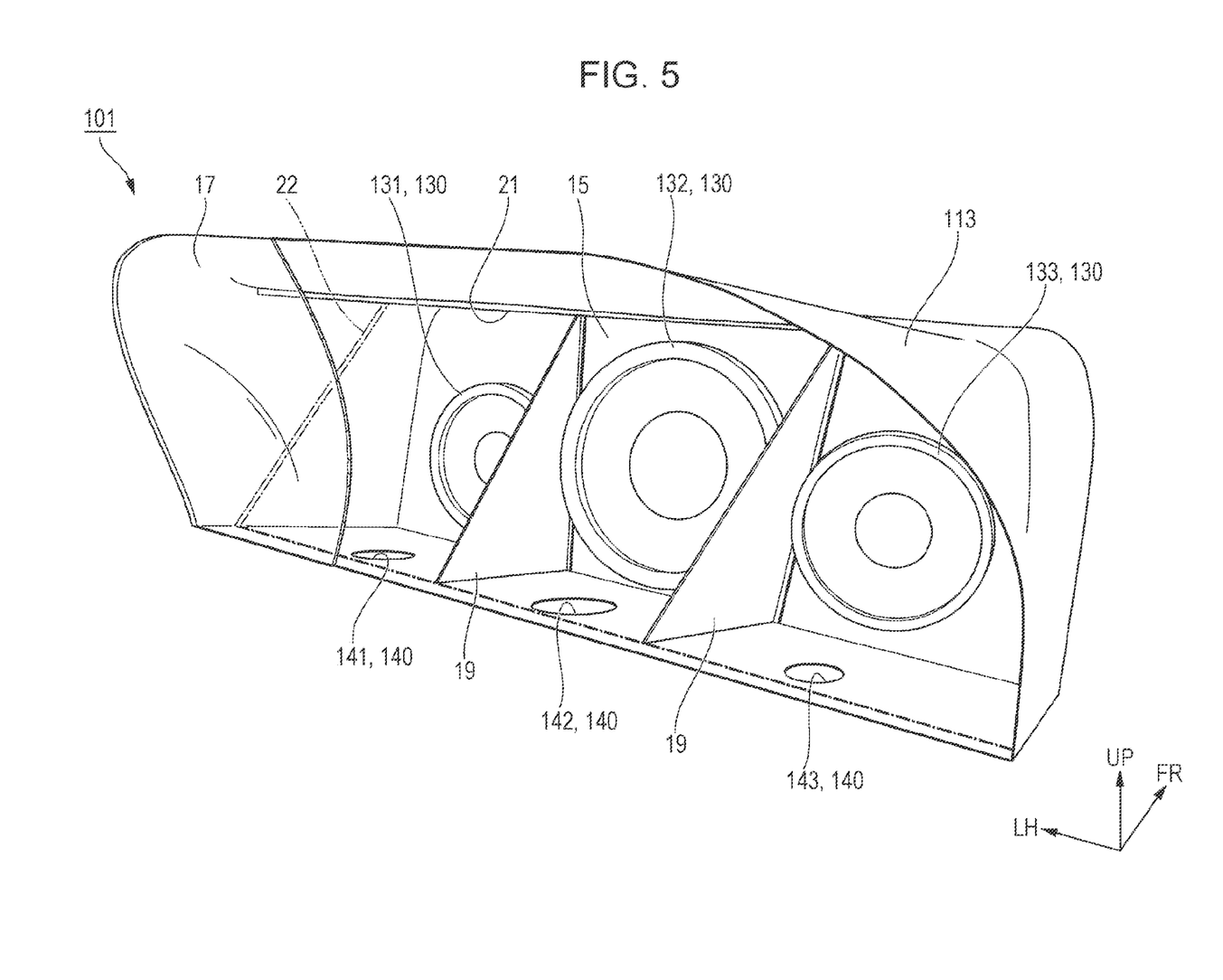
FIG. 5 is a schematic perspective view of a display device for a vehicle according to a second embodiment.

FIG. 5 is a schematic perspective view of a display device for a vehicle according to the second embodiment.

The second embodiment illustrated in FIG. 5 differs from the first embodiment illustrated in FIG. 1 in that a display device 101 for a vehicle includes three decorative members 130 and a divider plate 19 is provided upright between adjacent decorative members 130. It is to be noted that detailed description of the same components as in the first embodiment illustrated in FIG. 1 is omitted.

As illustrated in FIG. 5, the display device 101 for a vehicle includes a pair of divider plates 19, a decorative member 130, and a light source 140 that emits light to the decorative member.

The decorative member 130 includes a left decorative member 131, a central decorative member 132, and a right decorative member 133. The left decorative member 131 and the right decorative member 133 are formed in the same shape. The central decorative member 132 is formed to be larger than the left decorative member 131 and the right decorative member 133. The left decorative member 131, the central decorative member 132, and the right decorative member 133 of the decorative member 130 are provided side-by-side from left to right in this order on the major back surface of the meter board 15.

The light source 140 includes a left light source 141 capable of emitting light to the left decorative member 131, a central light source 142 capable of emitting light to the central decorative member 132, and a right light source 143 capable of emitting light to the right decorative member 133. The light source 140 is located in rear of each decorative member 130, and the left light source 141, the central light source 142, and the right light source 143 are provided side-by-side from left to right in this order on the internal lower surface of a garnish 113.

The pair of divider plates 19 is composed of a material having light blocking property and has a triangular plate shape. The divider plates 19 are provided upright between adjacent decorative members 130. That is, the pair of divider plates 19 is provided upright in the frontward and rearward direction between the left decorative member 131 and the central decorative member 132, as well as between the central decorative member 132 and the right decorative member 133. The space defined by the meter board 15, the internal lower surface of the garnish 113, and the half mirror 22 is divided into three subspaces by the pair of divider plates 19 in the right and left direction, and in each divided subspace, a decorative member 130 and a light source 140 are disposed. Thus, the divider plates 19 do not allow light from the light source 140 to leak into adjacent subspaces.

Next, the operation of the display device 101 for a vehicle in the present embodiment will be described.

Figure 6:
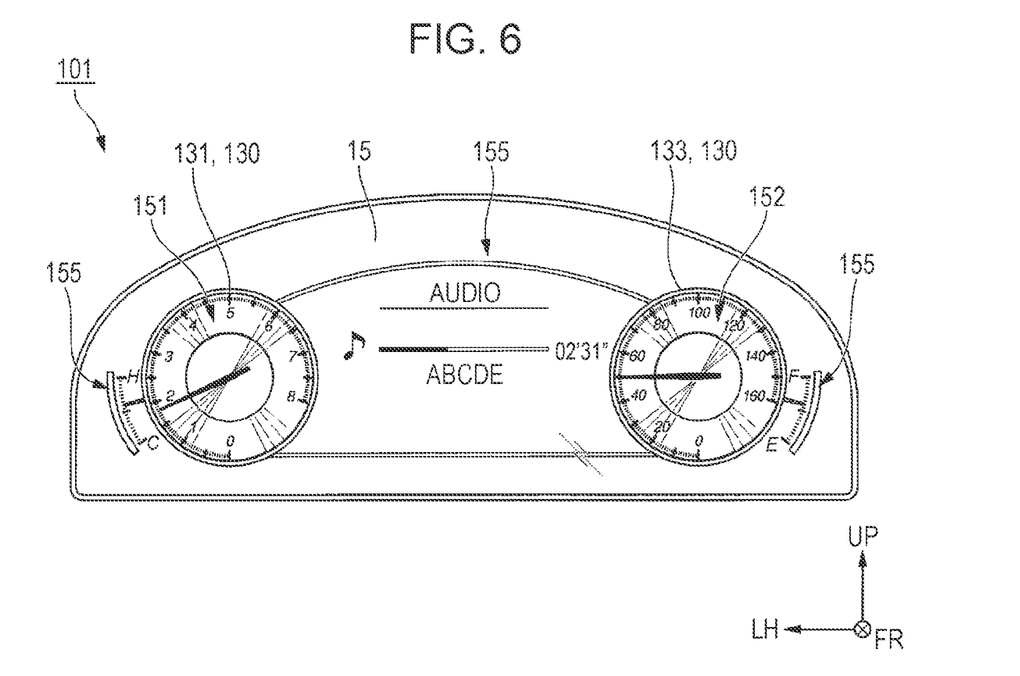
FIG. 6 is a front view illustrating a display manner in the display device for a vehicle according to the second embodiment.
Figure 7:
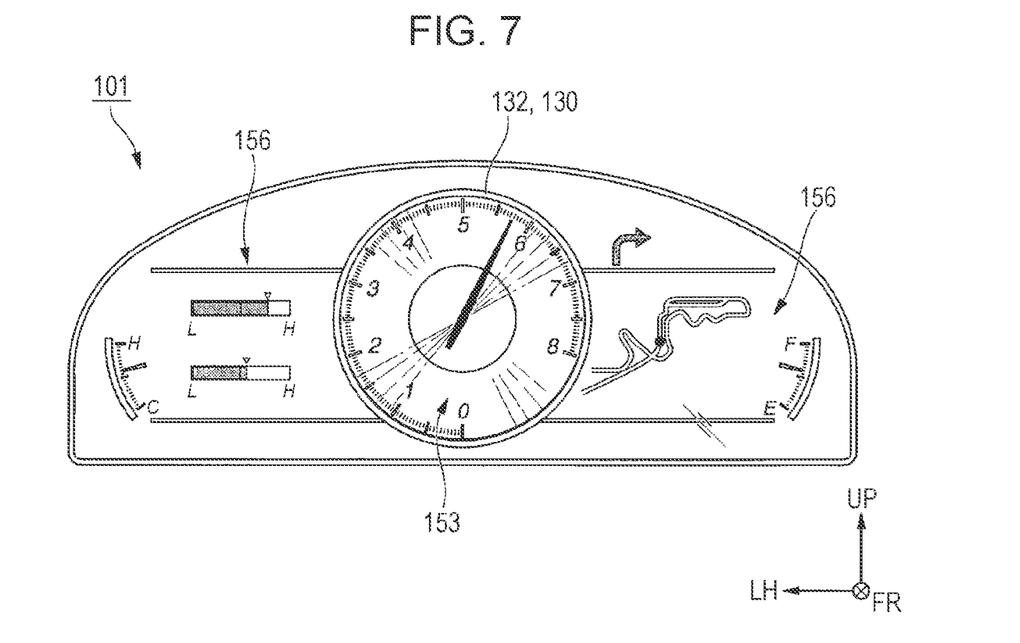
FIG. 7 is a front view illustrating a display manner in the display device for a vehicle according to the second embodiment.

FIGS. 6 and 7 are each a front view illustrating a display manner in the display device for a vehicle according to the second embodiment.

FIG. 6 illustrates the manner in which light is emitted to the left decorative member 131 and the right decorative member 133 by the light source 140. That is, the left light source 141 and the right light source 143 are in light-on state, and the left decorative member 131 and the right decorative member 133 are visually recognizable to the driver. The central light source 142 is in light-off state, and the central decorative member 132 is not visually recognizable to the driver. At this point, the virtual image generation unit 20 displays a first meter image 151, a second meter image 152, and a first information image 155.

The first meter image 151 is displayed as a virtual image of the tachometer on the left decorative member 131 as viewed from the driver. The driver is able to visually recognize the superimposed display of the left decorative member 131 and the first meter image 151 as the tachometer.

The second meter image 152 is displayed as a virtual image of the speedometer on the right decorative member 133 as viewed from the driver. The driver is able to visually recognize the superimposed display of the right decorative member 133 and the second meter image 152 as the speedometer.

The first information image 155 is displayed on the meter board 15 as viewed from the driver. In the meter board 15, the first information image 155 displays a coolant temperature meter in the left end area, a fuel meter in the right end area, and music playback information image in the center area. That is, in the manner illustrated in FIG. 7, the first information image 155 is displayed in the area where the central decorative member 132 is visually recognized without being restricted by the shape of the central decorative member 132.

FIG. 7 illustrates the manner in which light is emitted to the central decorative member 132 by the light source 140. That is, the central light source 142 is in light-on state, and the central decorative member 132 is visually recognizable to the driver. The left light source 141 and the right light source 143 are in light-off state, and the left decorative member 131 and the right decorative member 133 are not visually recognizable to the driver. At this point, the virtual image generation unit 20 displays a third meter image 153 and a second information image 156.

The third meter image 153 is displayed as a virtual image of the tachometer on the central decorative member 132 as viewed from the driver. The driver is able to visually recognize the superimposed display of the central decorative member 132 and the third meter image 153 as the tachometer.

The second information image 156 is displayed on the meter board 15 as viewed from the driver. In the meter board 15, the second information image 156 displays information such as hydraulic pressure and coolant temperature in the left end area, and information on vehicle position and fuel meter in the right end area. That is, the second information image 156 is displayed in the area where the left decorative member 131 and the right decorative member 133 are visually recognized in the manner illustrated in FIG. 6 without being restricted by the shape of the left decorative member 131 and the right decorative member 133.

In this manner, the display device 101 for a vehicle in this embodiment includes the divider plates 19 between adjacent plural decorative members 130 (the left decorative member 131, the central decorative member 132, the right decorative member 133), the divider plates 19 being provided upright not to allow leakage of light which is emitted from the plural light sources 140.

With this configuration, the light emitted from each light source 140 in light-on state is not allowed to leak into a decorative member 130 other than the target decorative member 130 to be emitted. Thus, it is possible to avoid a situation in which a decorative member 130 other than the target decorative member is visually recognizable to the driver due to leakage light. Consequently, the display device 101 for a vehicle achieves high display quality.

The present disclosure is not limited to the above embodiments that have been described with reference to the drawings, and various modifications may be possible in the technical scope of the present disclosure.

For example, in the above-described embodiments, the information images 55, 56, 155, 156 display a coolant temperature meter, a selection screen for music files, vehicle position information, and others. However without being limited to this, the information images 55, 56, 155, 156 may display various pieces of information including information other than the above-mentioned contents of display independently or in combination in any area. In addition, the coolant temperature meter, the fuel meter and others displayed in the information images 55, 56, 155, 156 may be visually recognizable to the driver as a real image in part.

In the above-described embodiments, the needles of the speedometer and the tachometer are each displayed as a needle image in the meter images 51, 52, 151, 152, 153 which are virtual images. However, the present disclosure is not limited to this. For example, the needles of the speedometer and the tachometer may be formed as a real needle on the decorative members 30, 130 and the real image may be visually recognizable to the driver.

Although the decorative members 30, 130 are composed of a metal material in the above-described embodiments, the present disclosure is not limited to this. For example, a decorative member may be composed of a resin material and metallic-effect or wood-effect coating or crimping processing may be applied to the surface of the decorative member.

The left decorative member 31 and the right decorative member 32 as well as the left decorative member 131 and the right decorative member 133 are formed in the same shape in the above-described embodiments. However, without being limited to this, the left and right decorative members may be formed in different shapes.

Alternatively, the display devices 1, 101 for vehicle may have a function of detecting the seating position of the driver. With this function, the display devices 1, 101 for vehicle are capable of displaying each of the meter images and information images at a more appropriate position even when the position a driver changes, and thus high display quality is achieved.

In addition, the components in the above-described embodiments may be replaced with well-known components as appropriately without departing from the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A display device for a vehicle, the display device comprising:
   at least one decorative member;
   at least one light source that emits light to the decorative member; and
   a virtual image generation unit that displays a virtual image between a driver of the vehicle and the decorative member,
   wherein the light source is disposed closer to the driver than the decorative member, and is alternately switchable between a light-on state and a light-off state while the virtual image generation unit displaying a virtual image,
   wherein the at least one decorative member includes plural decorative members; and
   the at least one light source includes plural light sources, each emitting light to corresponding one of the decorative members,
   wherein the decorative members include a first decorative member and a second decorative member,
   the light sources include
     a first light source capable of emitting light to the first decorative member, and
     a second light source capable of emitting light to the second decorative member,
   the virtual image generation unit
     displays the virtual image between the driver and the first decorative member when the first light source is in light-off state and the second light source is in light-on state, and
     displays the virtual image between the driver and the second decorative member when the first light source is in light-on state and the second light source is in light-off state.

2. The display device for a vehicle according to claim 1, wherein the virtual image generation unit displays the virtual image of a needle gauge indicating a vehicle speed between the first decorative member and the driver in a state where light is emitted to the first decorative member by the first light source, and displays the virtual image of a needle gauge indicating an engine rotational speed between the second decorative member and the driver in a state where light is emitted to the second decorative member by the second light source.

3. The display device for a vehicle according to claim 1, wherein a partition plate is provided upright between the decorative members adjacent to each other to avoid leakage of light which is emitted from the light sources.

4. The display device for a vehicle according to claim 1, wherein the decorative member is composed of a metal material.

5. The display device for a vehicle according to claim 1, wherein the light source is disposed between the driver and the decorative member along a longitudinal direction of the vehicle.

6. The display device for a vehicle according to claim 5, wherein the decorative member, the light source and a driver seat are disposed in this order along a longitudinal direction of the vehicle.

7. A vehicle comprising the display device according to claim 1.

8. The display device for a vehicle according to claim 1, wherein the decorative member is disposed in a dashboard of the vehicle and the light source is disposed on a vehicle interior side of the decorative member.

9. The display device for a vehicle according to claim 8, wherein the virtual image generation unit includes a half mirror disposed on the vehicle interior side of the decorative member, and wherein the light source is positioned between the half mirror and the decorative member.

10. The display device for a vehicle according to claim 9, wherein, when the light source is in the light-on state, the half mirror displays an image of the decorative member by reflection light reflected from the decorative member and incident on a rear surface of the half mirror.

11. The display device for a vehicle according to claim 10, wherein the virtual image generation unit projects the virtual image on a front surface of the half mirror.

12. A display device for a vehicle, the display device comprising:
at least one decorative member;
at least one light source that emits light to the decorative member; and
a virtual image generation unit that displays a virtual image between a driver of the vehicle and the decorative member,
wherein the light source is disposed closer to the driver than the decorative member, and is alternately switchable between a light-on state and a light-off state while the virtual image generation unit displaying a virtual image,
wherein the decorative member is disposed in a dashboard of the vehicle and the light source is disposed on a vehicle interior side of the decorative member,
wherein the virtual image generation unit includes a half mirror disposed on the vehicle interior side of the decorative member, and
wherein the light source is positioned between the half mirror and the decorative member,
wherein, when the light source is in the light-on state, the half mirror displays an image of the decorative member by reflection light reflected from the decorative member and incident on a rear surface of the half mirror,
wherein the virtual image generation unit projects the virtual image on a front surface of the half mirror,
wherein the at least one decorative member includes a first decorative member and a second decorative member,
the at least one light source includes
a first light source capable of emitting light to the first decorative member, and
a second light source capable of emitting light to the second decorative member,
the virtual image generation unit
displays the virtual image on the front surface of the half mirror corresponding to the first decorative member when the first light source is in light-off state and the second light source is in light-on state, and
displays the virtual image on the front surface of the half mirror corresponding to the second decorative member when the first light source is in light-on state and the second light source is in light-off state.

* * * * *